United States Patent [19]
Marshall

[11] Patent Number: 5,199,690
[45] Date of Patent: Apr. 6, 1993

[54] ACTIVE VIBRATION ISOLATION SYSTEM

[75] Inventor: Philip Marshall, Lexington, Mass.

[73] Assignee: M/RAD Corporation, Woburn, Mass.

[21] Appl. No.: 922,650

[22] Filed: Jul. 30, 1992

Related U.S. Application Data

[63] Continuation of Ser. No. 558,642, Jul. 26, 1990, abandoned.

[51] Int. Cl.[5] ............................. F16F 9/22; F16F 9/43
[52] U.S. Cl. .............................. 267/64.25; 267/64.26; 267/64.19; 267/136; 267/64.28; 248/619; 248/631
[58] Field of Search .... 267/64.21, 64.23, 64.25–64.28, 267/64.15, 64.16, 64.19, 218, 136; 248/631, 619, 620, 638

[56] References Cited

U.S. PATENT DOCUMENTS

| | | | |
|---|---|---|---|
| 962,246 | 6/1910 | Rockwell | 267/64.28 |
| 3,140,880 | 7/1964 | Masser | 267/64.21 X |
| 3,227,470 | 1/1966 | Funk | 267/64.27 X |
| 3,361,444 | 1/1968 | Harbers | 267/64.19 X |
| 3,682,431 | 8/1972 | Vivian | 248/631 |
| 3,794,277 | 2/1974 | Smedley et al. | 248/618 X |
| 4,108,270 | 8/1978 | Mifsud | 248/631 X |
| 4,402,483 | 9/1983 | Kurabayashi et al. | 248/638 X |
| 4,706,923 | 11/1987 | Krejcir et al. | 267/64.28 X |
| 4,927,119 | 5/1990 | Frost | 248/638 X |
| 4,972,930 | 11/1990 | Davis | 267/136 X |
| 5,028,180 | 7/1991 | Sheldon et al. | 248/631 X |

FOREIGN PATENT DOCUMENTS 0828349  2/1960  United Kingdom ............. 267/64.19

Primary Examiner—Douglas C. Butler
Assistant Examiner—Josie A. Ballato
Attorney, Agent, or Firm—Pandiscio & Pandiscio

[57] ABSTRACT

An active vibration isolation system which has three groups of airbag springs for supporting a load and isolating the load from vibration, together with a servo-valve system for admitting pressurized air to or exhausting pressurized air from each group of the airbag springs, and a damping system for damping movement of the load. The damping system comprises a plurality of pairs of shock absorbers which are mounted in parallel with and adjacent to the airbag springs. The shock absorbers are arranged so as to provide damping for each of the groups of airbag springs in three mutually-orthogonal directions.

15 Claims, 3 Drawing Sheets

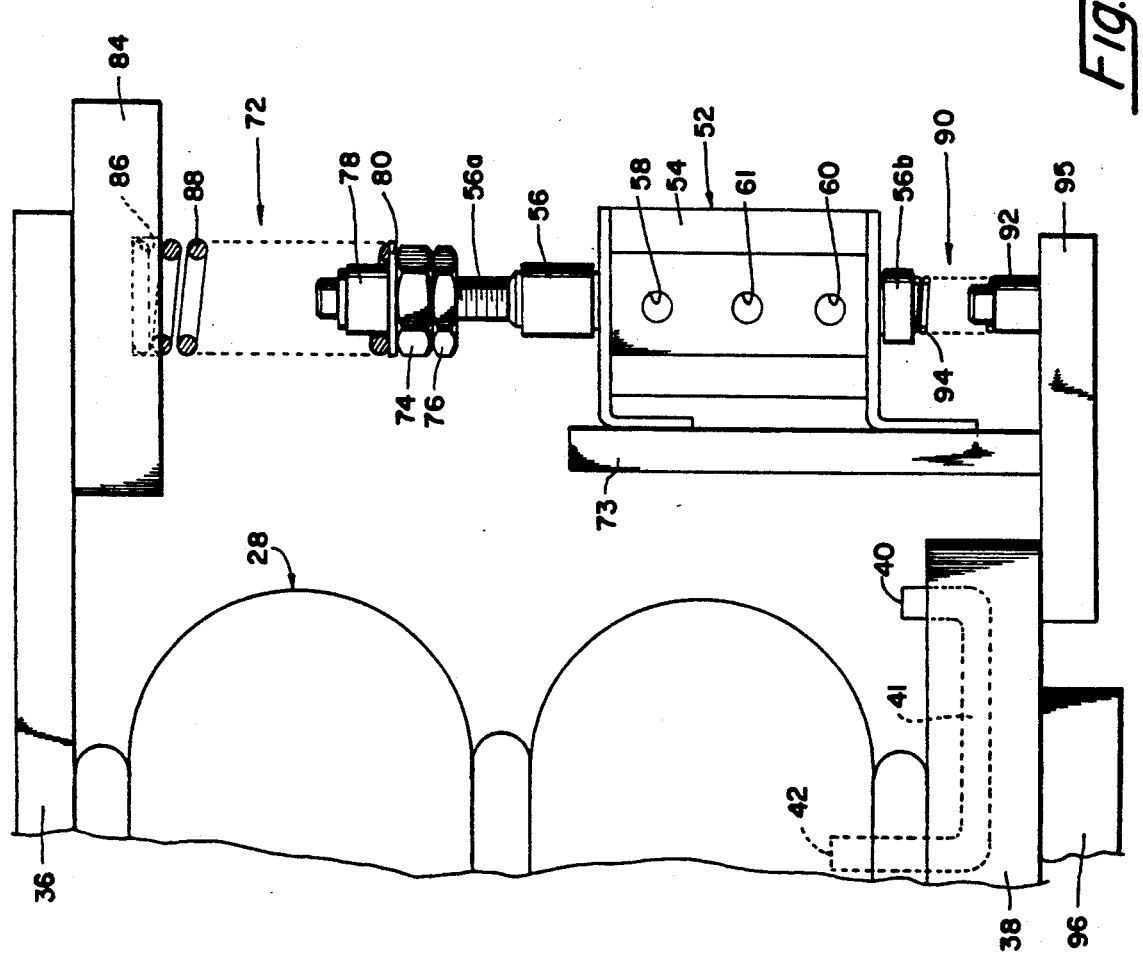

ACTIVE VIBRATION ISOLATION SYSTEM

This is a continuation of copending application(s) Ser. No. 07/558,642 filed on Jul. 26, 1990, now abandoned.

FIELD OF THE INVENTION

The present invention relates to vibration isolation systems, and more particularly to active vibration isolation systems having pneumatic isolators and servo-valve feedback systems for controlling the height of the pneumatic isolators.

BACKGROUND OF THE INVENTION

Active vibration isolation systems comprising a plurality of pneumatic isolators for isolating a load from vibration are known. Such systems typically include three servo-valves for admitting pressurized air to, or releasing pressurized air from, three respective groups of pneumatic isolators based on changes in position of the top surface of the isolators relative to the surface on which the load is supported due to changes in the load. Such a change may occur, for instance, when the load is a stamping press and the latter goes from an idle cycle to a stamping cycle. Thus, as used herein, "change in the load" means a change in position of the center of mass of the load or any other movement of the load which generates a force having a vertical component. The quantity of pressurized air added to or released from the pneumatic isolators is controlled, as a function of the design and adjustment of the servo valves, so that the position of the load remains substantially constant, regardless of changes in the load.

To achieve stability in a vibration isolation system using pneumatic isolators, it is important that the pneumatic isolators be damped. Moreover, the degree of damping required increases as a function of the amount of feedback provided by the servo valve system.

One active vibration isolation system which uses damping to improve the stability of the system is manufactured by MRAD Corporation of Woburn, Mass. and is identified by model number D11020. The MRAD system includes three groups of pneumatic isolators for supporting the load to be isolated from vibration. The MRAD system also includes a servo valve system, including three servo valves, for controlling the height of the load by admitting or releasing air from a corresponding respective one of the groups of pneumatic isolators.

The MRAD system further includes a damping system for damping movement of the pneumatic isolators comprising a tube mounted in each of the airbag springs so as to extend perpendicular to the surface on which the load is supported. Each tube is closed off at its ends and includes an orifice coupling the interior of the tube with the interior of the airbag spring. As pressurized air is added to or released from the interior of the airbag spring, air will flow into or out of the interior of the tube via the orifice therein until the air pressure in the interior of the tube stabilizes with that in the interior of the airbag spring. This flow of air into and out of the interior of the tube damps movement of the airbag spring.

Although the internal tube damping arrangement of the MRAD system provides satisfactory damping under certain conditions, under other conditions the amount of damping provided by the system is inadequate. When the quantity of air admitted to or exhausted from the airbag springs during a given relatively short period of time is relatively large, the orifice in the tube is not sufficiently large to pass the quantity of air required to obtain meaningful damping. If the size of the orifice is enlarged to obtain satisfactory damping during times of large exchange of air, then virtually no damping is provided during times of small exchange of air. Thus, the MRAD system provides a relatively small amount of feedback which reacts relatively slowly to changes in the load.

OBJECTS AND SUMMARY OF THE INVENTION

One object of the present invention is to provide an active vibration isolation system comprising a plurality of pneumatic isolators and a damping assembly capable of adequately damping the pneumatic isolators even when a significant load change occurs.

Another object of the present invention is to provide a pneumatic isolator-type active vibration isolation system including a damping system which reacts quickly and is capable of providing a relatively large amount of damping.

These and other objects are accomplished by an active vibration isolation system which in its preferred form comprises three groups of airbag springs, each group containing one or more airbag springs, a servo-valve system for controlling the height of the airbag springs, and an external damping system for damping movement of the airbag springs. The servo-valve system comprises three servo valves, each adapted for controlling the quantity of pressurized air admitted to or exhausted from a respective one of the three groups of airbag springs so as to control the height of that group. The servo valves are designed to provide a relatively large amount of feedback, i.e. they are capable of admitting or exhausting relatively large quantities of pressurized air from the airbag groups over a relatively short period of time. The damping system comprises a plurality of automotive-type shock absorbers which are mounted in varied configurations in parallel with the airbag springs, so as to damp movement of the airbag springs in all possible directions. The quantity of damping provided by the damping system is sufficient to accommodate the large amount of feedback provided by the servo system while maintaining stability of the isolation system.

BRIEF DESCRIPTION OF THE DRAWINGS

For a fuller understanding of the nature and objects of the present invention, reference should be made to the following detailed description taken in connection with the accompanying drawings wherein:

FIG. 3 is a side elevation view of a servo valve and associated mounting structure and a portion of the airbag spring with which the servo valve is associated.

DETAILED DESCRIPTION OF THE INVENTION

The present invention is an active vibration isolation system which is similar to the above-described system sold by MRAD corporation and identified by model no. D11020 (the "MRAD system"), except that a novel external damping system is used in place of the internal damping mechanism of the MRAD system.

Figure 1:
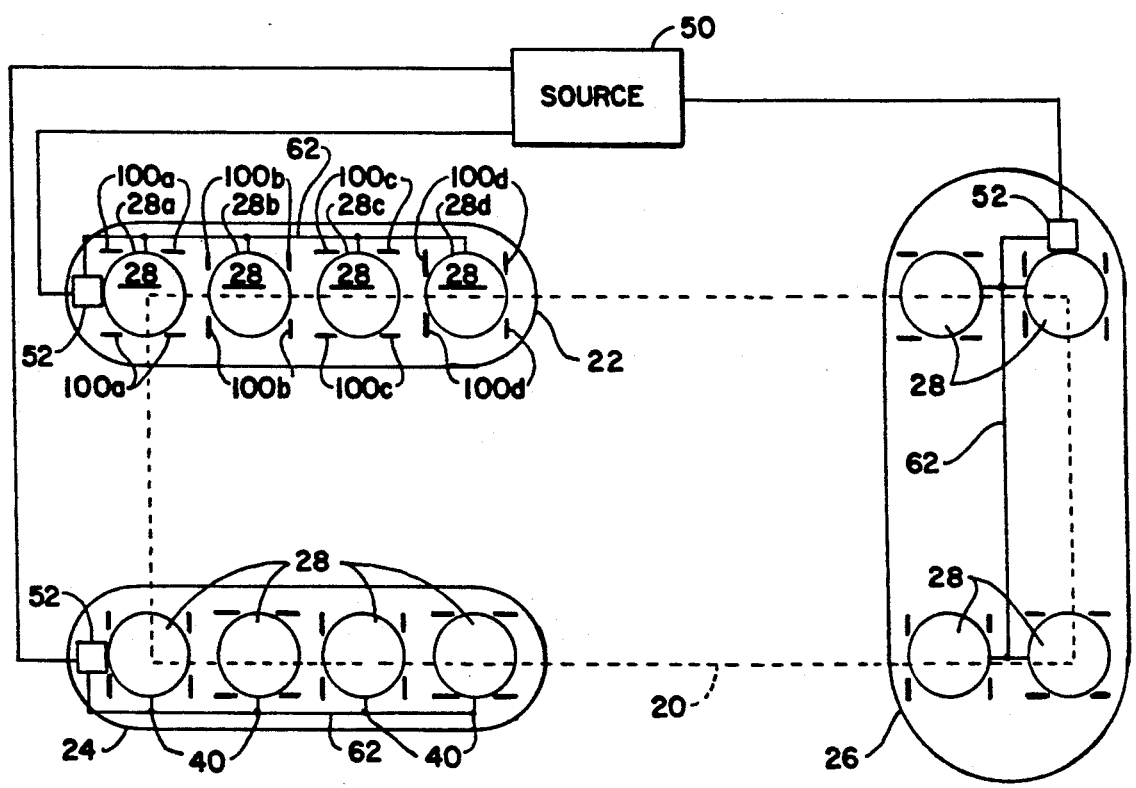
FIG. 1 is a schematic plan view illustration of an active vibration isolation system embodying the present invention.
Figure 2:
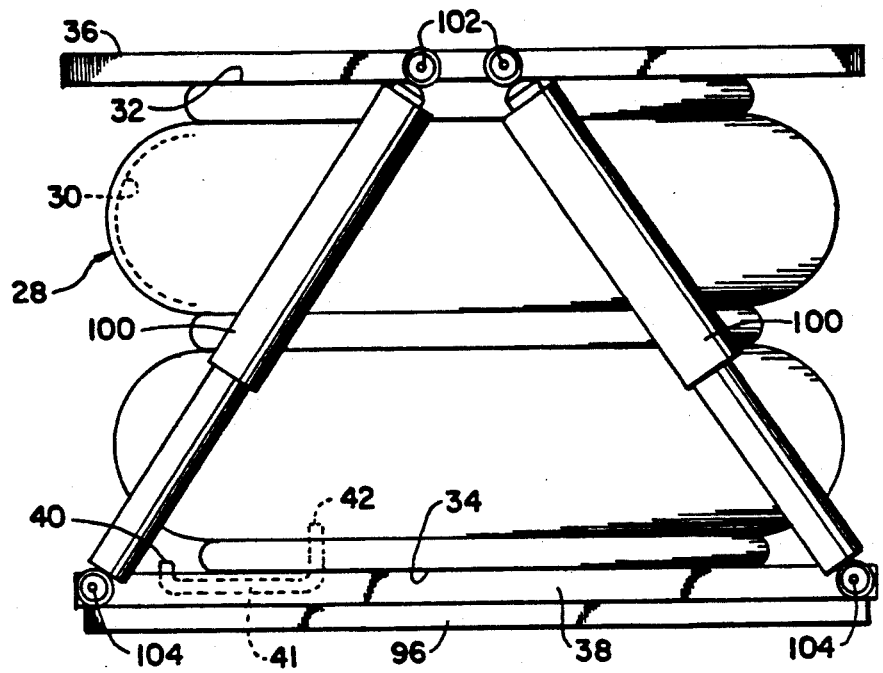
FIG. 2 is a side elevation view of one of the airbag spring assemblies of the system illustrated in FIG. 1 showing one arrangement of the external damping system.

Referring to FIGS. 1 and 2, the system therein shown comprises three groups of airbag springs 22, 24 and 26 for supporting a load 20. In the particular embodiment shown in FIG. 1, each of the groups 22-26 comprises four like airbag springs 28. However, the number of airbag springs in a group may range from one to some relatively large number depending upon the mass of the load to be supported.

Airbag springs 28 are conventional pneumatic isolators of the type manufactured by Firestone of Akron, Ohio and identified by model number W01-358-7219. Each of the airbag springs 28 includes a hollow interior 30 (FIG. 2) and top and bottom surfaces 32 and 34, respectively. The top and bottom surfaces 32 and 34 are closed off by rigid flat rectangular metal plates 36 and 38 respectively which are bolted or otherwise attached to airbag spring 28. Bottom plate 38 includes an external port 40, an internal passageway 41, and an internal port 42 for coupling the interior 30 of airbag spring 28 with a source of pressurized air 50 (FIG. 1). Plates 36 and 38 may be large enough so that one pair of those plates is coupled to each group of four air springs. Alternatively, each air spring 28 may be coupled to a different set of plates 36 and 38. Preferably one set of plates 36 and 38 is used for each group of air springs.

Airbag springs 28 have a bellows-like configuration so as to permit the airbag springs to expand and contract vertically as a function of the air pressure in the hollow interior 30 thereof and the load change applied thereto. This expansion and contraction causes top and bottom plates 36 and 38 to move toward and away from one another.

Referring now to FIGS. 1 and 3, the present system also comprises a servo system for controlling the flow of pressurized air to and from the interior 30 of each airbag spring 28. The servo system includes the source of pressurized air 50, and three like pneumatic servo-valves 52, one for each of the groups of airbags 22-26. Additionally, the servo system may comprise other known devices (not shown) such as an air regulator and a gage panel. The latter comprises means for sensing and displaying the pressure in each airbag.

Servo-valves 52 are conventional and well-known, each of them typically comprising a housing 54 and an elongate spindle 56 which is slidably mounted for axial movement in housing 54. Spindle 56 comprises a threaded upper end 56a and a lower end 56b. Servo-valves 52 additionally comprise an air input port 58, an air output port 60, and an air vent port 61. Each input port 58 is coupled with pressurized air source 50 and each output port 60 is coupled with the interiors 30 of the airbag springs 28 in the group with which the given servo-valve 52 is associated via a tube network 62. The vent port 61 communicates with the ambient atmosphere.

Servo-valves 52 are designed to admit pressurized air to or release pressurized air from the interiors 30 of the associated airbags as a function of the axial position of spindle 56 relative to housing 54. More specifically, at one end of the valve spindle stroke in a given direction, i.e., the range of axial travel of spindle 56, a first passage (not shown) inside housing 54 is completely opened, thereby coupling input port 58 with output port 60, whereby pressurized air is provided to the interiors 30 of the airbag springs. At the other end of the valve spindle stroke, a second passage (not shown) inside housing 54 is coupled with vent port 61, whereby the interiors 30 of the airbag springs are coupled with the atmosphere surrounding the airbag springs. In the middle portion of the range of axial travel of spindle 56, i.e., at the midpoint of the valve spindle stroke (the "center position" of the valve spindle), the first and second passages inside housing 54 are closed off, whereby no pressurized air is delivered or exhausted from the airbag springs. When the valve spindle is located between its center position and one of its end stroke positions, the first passage in housing 54 is coupled with output port 60, whereby pressurized air is admitted to the airbag springs. When the valve spindle is located between its center position and its other end stroke position, the second passage in housing 54 is coupled to output port 60, whereby pressurized air is exhausted from the airbag. The effective sizes of the air inlet and air outlet openings provided by valves 52 varies as a function of the specific axial position of spindle 56. Lexair, Inc. of Lexington, Ky. manufactures a "Hi-Cyclic" directional control valve identified by model number B which may be satisfactorily employed as a servo-valve 52.

The servo system also comprises a linkage assembly 72 for coupling each servo-valve spindle 56 with the top plate 36 of an airbag spring 28 in the one of groups 22-26 with which the servo-valve is associated. This coupling is effected so that relative movement of the plates 36 and 38 toward and away from one another is transmitted to the spindle 56 so as to cause the spindle to move back and forth along its longitudinal axis. Preferably, the airbag springs 28 with which the servo-valves 52 are coupled are selected so as to be positioned at outer corners of the system, i.e. so that the servo-valves are spaced as far apart from one another as possible.

The linkage assembly 72 includes a bracket 73 for supporting a servo-valve 52 in a fixed, vertical position adjacent an airbag spring 28 so that the axis of the spindle 56 of the servo-valve extends perpendicular to the top and bottom plates 36 and 38 of the airbag spring. The linkage assembly 72 also comprises a pair of nuts 74 and 76 which are screwed onto the threaded upper end 56a of spindle 56, and a hollow spacer sleeve 78 which surrounds upper end 56a. Sleeve 78 includes a flange 80 at its bottom end which rests on the top surface of nut 74. Assembly 72 also includes a mounting plate 84 secured to the bottom surface of plate 36. Member 84 has a blind bore 86 in its bottom surface in line with spindle 56. Assembly 72 further includes a coil compression spring 88, one end of which is received in blind bore 86 and the other end of which surrounds sleeve 78 and is supported by flange 80.

The linkage assembly 72 further includes a device 90 for opposing movement of spindle 56 in a downward direction. Device 90 includes a pedestal 92 attached to the upper surface of a bracket plate 95 which is in turn affixed to plate 38. A coil compression spring 94 is positioned between and engaged by pedestal 92 and the bottom portion 56b of spindle 56.

It is contemplated that the load 20 may rest on a bed (not shown) which is supported by plate 36. Instead of mounting the above-described linkage assembly to the plates 36 and 38 as shown in FIG. 3, it may be coupled between the surface or supporting structure 96 on which plate 38 of the airbag spring 28 rests, and the bottom surface of the load 20 or bed carried by plate 36 (not shown). However, the servo-valves are coupled to the groups of air springs, they are positioned as far apart from one another as possible.

To the extent already described herein, the illustrated apparatus is similar to the prior MRAD system. However, the damping assembly of the present active vibration isolation system differs from the damping assembly of the prior MRAD system in the manner hereinafter described.

Figure 4:
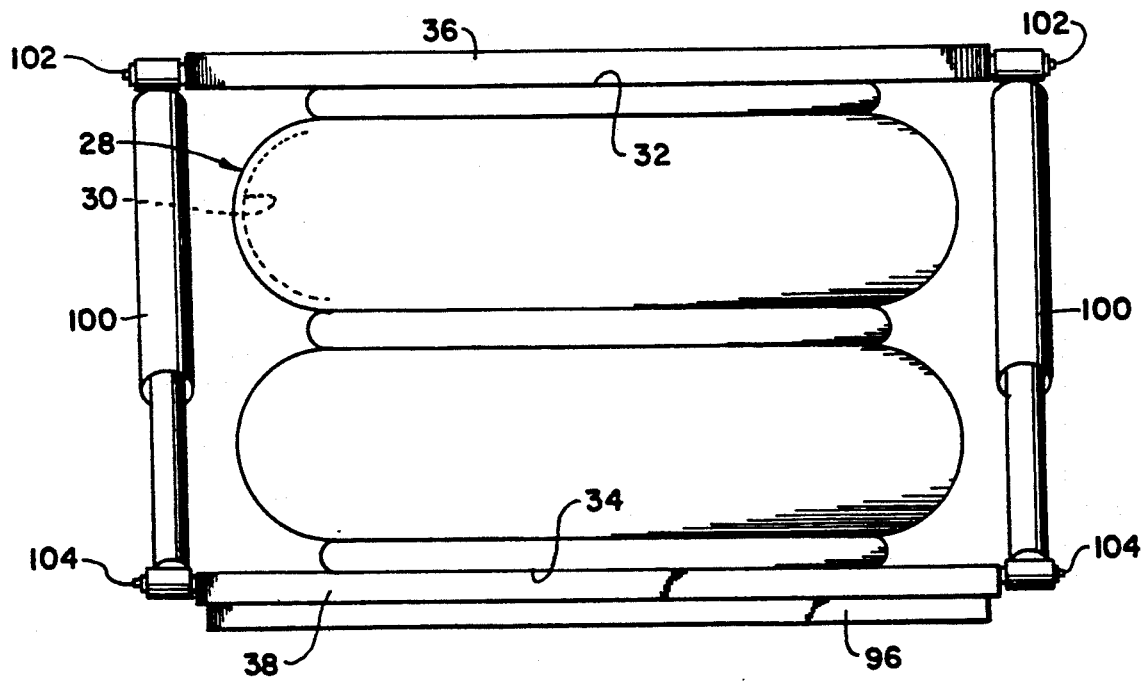
FIG. 4 is a front elevation view of the airbag spring assembly showed in FIG. 2.

Referring to FIGS. 1-4, the damping system of the present invention preferably comprises a plurality of automotive-type hydraulic shock absorbers 100 for damping movement of plates 36 and 38 toward and away from another. A suitable shock absorber 100 is sold by Sears and is identified by model number 93701. The shock absorbers 100 are positioned adjacent the airbag springs 28 in pairs, with the upper end of each shock absorber 100 being pivotally attached via a bolt 102 to one side of top plate 36 and the bottom end of each shock absorber 100 being pivotally attached via a bolt 104 to the corresponding side of bottom plate 38. Top and bottom plates 36 and 38 include threaded apertures (not shown) for receiving bolts 102 and 104. The shock absorbers are used in pairs arranged parallel to an airbag spring. As illustrated in FIGS. 2 and 4, the "parallel" arrangement of each pair of shock absorbers to the associated airbag contemplates that the plane containing the longitudinal axes of the shock absorber pairs is parallel to the longitudinal axis of its associated airbag. Typically, two pairs of shock absorbers 100 are coupled in parallel with each airbag spring 28, with one pair of shock absorbers being connected to corresponding first sides of plates 36 and 38 and the second pair of shock absorbers being connected to corresponding second sides of the same plates, with the first sides being opposite to the second sides as shown in FIG. 4. Thus two shock absorbers are positioned on one side of the airbag spring and two shock absorbers are positioned on the opposite side of the airbag spring. Alternatively, four pairs of shock absorbers 100 may be attached to each airbag spring 28, one pair on each of the four sides of plates 36 and 38.

Shock absorbers 100 are attached between plates 36 and 38 so that the long axes thereof extend transversely to the planes of the plates. In the embodiment shown in FIGS. 2 and 4, each pair of shock absorbers 100 is positioned so that the upper ends of the shock absorbers are positioned closer to one another than the lower ends. Preferably they are arranged so that their longitudinal axes extend at about a 45° angle to the planes of plates 36 and 38. Alternatively, the shock absorbers 100 may be positioned so that the lower ends thereof are closer together than the upper ends. By including the shock absorbers as shown, they are able to provide damping of both horizontal and vertical vibrational movement. The specific angular inclination of the shock absorbers 100 will vary depending upon the amount of damping to be provided in the vertical versus the horizontal direction. Thus the angle of inclination may be greater or smaller than 45°.

When only two pairs of shock absorbers 100 are used for each air spring, it is preferred that the air springs be positioned in a selected alternating relationship. More specifically, the four air springs 28a-d are oriented so that the two pairs of shock absorbers 100a of air spring 28a and the two pairs of shock absorbers 100c of air spring 28c extend in a first pair of parallel (vertical) planes, and the two pairs of shock absorbers 100b of spring 28b and the two pairs of shock absorbers of spring 28d extend in a second pair of parallel (vertical) planes that extend at a right angle to the first pair of vertical planes. When four pairs of extending shock absorbers 100 are attached to each of the airbag springs 28 in a given group, the need for the above-described alternating relationship is avoided.

Preferably the groups 22, 24 and 26 are arranged so that if the damping means 100 of the air springs 28 of group 22 reside in vertical planes that extend in a first horizontal direction, the air springs 28 of group 24 are oriented so that their corresponding damping means 100 reside in vertical planes that extend in a second horizontal direction at a right angle to the first horizontal direction, as shown in FIG. 1.

Although the present damping system has been described as comprising automotive-type hydraulic shock absorbers, alternative damping devices may be used. For instance, pneumatic shock absorbers may be employed in place of hydraulic shock absorbers 100. The specific damping characteristics or parameters of the damping devices are selected according to the operational characteristics of servo-valves 52, the mass of the load 20, and the number and design of the airbag springs 28. However, the damping devices should be constructed so that the damping force provided is proportional to the velocity of the force applied across the damping devices. Furthermore, the damping devices must be selected so that their damping capacity and reaction period is such that stability is maintained in the present vibration isolation system.

In practice the load 20 may be placed on and coupled directly to plates 36. Preferably, however, a load supporting bed (not shown) is attached to plates 36 and the load is supported by that bed.

In operation, with load 20 supported by the three groups 22-26 of air springs 28, the servo system is activated so as to provide pressurized air to the interiors 30 of the airbag springs 28. Such pressurized air is provided from source 50 to servo-valves 52 which deliver the pressurized air to the airbag springs 28 via tubing network 62. Vibration transmitted to the surface 96 on which the airbag springs 28 rest is absorbed by the airbag springs 28 and the damping means 100, thereby isolating the load from the vibration. Similarly, vibration or other forces generated by or applied to load 20 are also absorbed by airbag springs 28 and damping means 100, thereby isolating the load from the surface 96 on which the airbag springs rest. This ability to isolate load 20 from surface 96 is particularly important when the load itself generates significant vibration, e.g. when the load is a shaker table and vibration-sensitive equipment is positioned adjacent the load.

When load 20 generates vibration of certain amplitude and frequency, or when the center of mass of the load moves from one to another position, the top plates 36 of the airbag springs 28 in one or more of the groups 22-26 are driven toward and/or away from the respective bottom plates 38 of the airbag springs. For each of the airbag springs 28 coupled with a servo-valve 52, movement of the top plate 36 toward the bottom plate 38 is transmitted via linkage assembly 72 to the spindle 56 of the associated servo-valve 52 so as to cause the spindle to move axially. When top and bottom plates 36 and 38 have been driven toward one another by load 20 so as to be separated by less than a predetermined distance, spindle 56 is driven downwardly by linkage assembly 72 so as to open the internal passage in spindle housing 54 coupling input port 58 with output port 60. This coupling causes pressurized air to be supplied via tubing network 62 to the ports 40, and hence to the interiors 30, of the airbag springs in the one of groups 22-26 associated with the servo-valve. As this pressurized air flows into the interiors 30 of the airbag springs 28, the air pressure inside the airbag springs increases. This increase in air pressure forces top plate 36 up away from bottom plate 38.

As pressurized air is supplied to the interiors 30 of the airbag springs 28 in a given one of the groups 22-26, the spacing between top and bottom plates 36 and 38 increases. This increase causes linkage assembly 72 to pull the spindle 56 in the associated servo-valve 52 upwardly. At some point in this upward movement, which is determined based on the size and configuration of linkage assembly 72 and the adjustment of nuts 74 and 76, the spindle 56 will be moved sufficiently upwardly so as to block the internal passage in housing 54 of servo-valve 52. This blockage cuts off the flow of pressurized air from source 50 to the interiors 30 of the airbag springs 28.

Under other load vibration conditions, or when the center of mass of the load moves in a different direction, the top and bottom plates 36 and 38 of the airbag springs 28 of one or more groups 22-26 will be caused to move apart from one another. As the spacing between the top and bottom plates 36 and 38 of the airbag 28 coupled with a servo-valve 52 exceeds a predetermined distance, the spindles 56 of the servo-valves 52 will be moved upwardly by the associated linkage assemblies 72 a distance sufficient to open the internal passage in spindle housing 54 coupling port 40 (which is coupled with the interiors 30 of the airbag springs 28) with the vent ports 61 of the servo-valves 52. As pressurized air escapes from the interiors 30 of airbag springs 28 to ambient, the top and bottom plates 36 and 38 move toward one another. This movement, which is transmitted by the linkage assemblies 72 to the spindles 56, causes the spindles to move downwardly until the spindles block the internal passage in housing 54 so that no air is either delivered or exhausted and a center position is reached.

This process of admitting pressurized air to and exhausting pressurized air from the interiors 30 of the airbag springs 28 is designed to ensure the top plates of all of the airbag springs lie along a common plane which extends parallel to surface 96 on which the airbag springs 28 rest, i.e. a center. When changes in the load 20 supported by the airbag springs 28 cause a change in spacing between the top and bottom plates 36 and 38 of the airbag springs, the associated servo-valve 52 operates as described above so as to cause the height of the airbag springs to increase or decrease, as needed, so as to return the top plates of the airbag springs to the common plane. Thus the arrangement of air springs 28 and the servo system comprising valves 52 and linkages 72 serves as a load leveler as well as a vibration isolation system.

The pneumatic feedback of the present system permits the achievement of both mutual vibration isolation between the load and the surface on which the load ultimately rests and accommodates the large forces which may be generated by the load without "bottoming out" the airbag springs. The above-described process of admitting pressurized air to and exhausting pressurized air from the interiors 30 of the airbag springs 28 permits the use of relatively soft isolating springs capable of mutually vibration isolating the load and the surface on which it rests. If the airbag springs were sufficiently stiff to absorb without deflection the relatively large forces which the load may generate, then the ability to mutually vibration isolate the load and the surface on which it rests would be severely compromised.

Shock absorbers 100 damp movement of the airbag springs 28. By attaching shock absorbers 100 so that the long axes thereof extend transversely to the planes of plates 36 and 38, damping is obtained in two mutually-orthogonal directions, i.e. perpendicular and parallel to the planes of plates 36 and 38. By positioning the shock absorbers 100 of adjacent airbag springs 28 in a given one of groups 22-26 in alternating relation, as described above and shown in FIG. 1, or by providing pairs of transversely-extending shock absorbers on all four sides of the airbag springs, damping is obtained in three mutually-orthogonal directions for a given one of groups 22-26. These directions are: (1) perpendicular to the planes of plates 36 and 38, (2) parallel to the planes of the plates in a first direction, and (3) parallel to the planes of the plates in a second direction which is perpendicular to the first direction. It should be appreciated that for the arrangement of shock absorbers 100 shown in FIG. 1, damping is obtained in only two directions for a given airbag spring 28 (which have only two pairs of shock absorbers). However, because all of the airbag springs 28 in a given one of groups 22-26 are tied together laterally by the load resting on the airbag springs, damping achieved in the first direction by one of the airbag springs is transmitted to adjacent airbag springs which achieve damping only in the second direction, and vice versa. As such, and because all of the airbag springs provide damping in the vertical direction, damping is achieved in three directions for each of the airbag spring groups 22-26.

For known vibration isolation systems, such as the MRAD system, as well as for the present vibration isolation system, (a) as the response time of the servo-valves of the system decreases and (b) as the quantity of pressurized air admitted or exhausted per unit time increases, the quantity and response time of damping needed increases. With the present system, shock absorbers 100 provide a relatively large quantity of damping, with a short response time, in multiple directions, thereby ensuring the airbag springs 28 are adequately damped and the system remains stable.

The present vibration isolation system comprises three servo-valves 52 in accordance with conventional load support and leveling techniques. Such techniques are based on the geometric axiom that three points define a plane and the fact that it is easiest to level a plane at three points rather than four or more. However, under certain circumstances it may be desirable to provide more than three groups of airbag springs. In any event, one servo-valve 52 is provided for each of the groups of airbag springs.

Since certain changes may be made in the above system without departing from the scope of the invention herein involved, it is intended that all matter contained in the above description or shown in the accompanying drawings shall be interpreted in an illustrative and not in a limiting sense.

What is claimed is:

1. An active vibration isolation system for damping movement of a load comprising, in combination:

a plurality of airbag springs for supporting a load, each of said airbag springs having a top end and a bottom end, and a flexible air chamber extending between said top and bottom ends, with a port for admitting air to and removing air from said chamber;

a top plate and a bottom plate attached to the top and bottom ends, respectively, of each of said airbag springs, said top and bottom plates being caused to move toward and away from one another with changes in the load and the pressure of the volume of air within the chambers of said airbag springs;

a servo system for admitting air to and exhausting air from the chambers of said airbag springs as a function of changes in the spacing between said top and bottom plates, whereby to cause said airbag springs to expand or contract in a direction to oppose movement of said top and bottom plates toward and away from one another;

a plurality of damping means extending between and coupled to said plates so as to dampen relative movement of said plates in parallel with the damping action of said airbag springs, each of said damping means comprising at least one pair of hydraulic shock absorbers extending between and coupled to said top and bottom plates, each pair of shock absorbers being disposed next adjacent to an airbag spring, with at least one pair of shock absorbers associated with one airbag spring extending at a right angle to the shock absorbers associated with another airbag spring.

2. The active vibration isolation system of claim 1 wherein each airbag spring has a longitudinal axis extending centrally thereof; each shock absorber of said pairs having a longitudinal axis and the shock absorbers of each pair lying in a common plane; said at least one pair of shock absorbers being associated with each airbag spring in such manner that the longitudinal axis of said airbag spring lies parallel to the common plane which includes the axes of the said one pair of shock absorbers.

3. Apparatus according to claim 2 wherein said airbag springs are disposed so that their longitudinal axes extend perpendicularly to said top and bottom plates, and said shock absorbers being disposed so that their longitudinal axes extend transversely to said top and bottom plates.

4. Apparatus according to claim 3 wherein said shock absorbers extend at a 45° angle to said top and bottom plates.

5. Apparatus according to claim 3 wherein at least two pairs of said shock absorbers are associated with each airbag spring, and further wherein one of said two pairs of shock absorbers is positioned on one side of and next adjacent to its associated airbag spring and the other of said two pairs of shock absorbers is positioned on an opposite side of and next adjacent to its associated airbag spring, with the axes of said one pair of shock absorbers being disposed in a first plane extending at a right angle to said plates and the axes of said other pair of shock absorbers being disposed in a second plane that is parallel to said first plane.

6. Apparatus according to claim 1 wherein said plurality of airbag springs are arranged in at least three groups, and further including:

at least three servo-valves each operatively associated with a different one of said groups of airbag springs, each valve being pneumatically coupled to the chambers of the airbag springs associated therewith and being adapted for connection to a source of pressurized air, each valve having a movable operating member and being so constructed as to feed pressurized air to or exhaust pressurized air from said chambers of said associated airbag springs as a function of changes in position of said movable operating member; and a plurality of linkages each coupling said movable operating member of one of said at least three servo-valves to said top and bottom plates.

7. An active vibration isolation system for damping movement of a load comprising, in combination:

at least three groups of airbag springs, each airbag spring having an axis extending centrally thereof, said three groups of airbag springs being spaced from one another in a predetermined arrangement, each group including: a plurality of airbag springs containing air under pressure, each airbag spring having a top end and a bottom end spaced apart from one another, each of said airbag springs having a flexible air chamber extending between its top and bottom ends, with a port for admitting air to and removing air from said chamber;

at least three rigid top plates, each being attached to the top ends of a group of air springs; and at least three rigid bottom plates, each being attached to the bottom ends of a group of air springs; said top and bottom plates being caused to move toward and away from one another with changes in the load and the pressure of the volume of air within the chambers of said airbag springs;

a servo system including at least three servo-valve means, each being coupled to a different group of said airbag springs for supplying pressurized air to or exhausting pressurized air from said airbag springs as a function of the spacing between said top and bottom plates so as to cause said airbag springs to expand or contract in a direction to oppose movement of said top and bottom plates toward and away from one another, whereby any temporary deviation from a predetermined spacing between said plates caused by changes in said load is eliminated; and a plurality of damping means coupled to said plates so as to dampen relative movement of said plates in parallel with said airbag springs, each of said dampening means comprising at least one pair of hydraulic shock absorbers disposed next adjacent to an airbag spring and extending between and coupled to the top and bottom plates associated with such airbag spring, with at least one pair of shock absorbers associated with one airbag spring extending at a right angle to the shock absorbers associated with another airbag spring.

8. A system according to claim 7 wherein each of said plurality of damping means includes two pairs of shock absorbers disposed adjacent an airbag spring, one pair being attached to said plates so as to extend adjacent one side of its associated airbag spring in a first plane and the other pair being attached to said plates so as to extend adjacent an opposite side of such associated airbag spring in a second plane, said airbag springs in each of said groups being positioned relative to one another so that said first and second planes associated with any one of said airbag springs extend at a right angle to said first and second planes associated with each adjacent airbag spring.

9. A system according to claim 7 wherein said plurality of shock absorbers are operatively attached to each of said airbag springs so as to provide damping in three mutually-orthogonal directions.

10. A system according to claim 7 wherein each of said plurality of damping means includes two pairs of shock absorbers disposed adjacent an airbag spring, one pair being attached to said plates so as to extend adjacent one side of its associated airbag spring in a first plane and the other pair being attached to said plates so as to extend adjacent an opposite side of such associated airbag spring in a second plane, said airbag springs in each of said groups being positioned relative to one another so that said first and second planes associated with any one of said airbag springs extend at a right angle to said first and second planes associated with each adjacent airbag spring, and wherein a single plane contains the longitudinal axes of the airbag springs comprising each group of such airbag springs and said first and second planes associated with some of said airbag springs in such group extends at a right angle to the plane containing the axes of said airbag springs.

11. A system according to claim 7 wherein each of said plurality of damping means includes two pairs of shock absorbers disposed adjacent an airbag spring, one pair being attached to said plates so as to extend adjacent one side of its associated airbag spring in a first plane and the other pair being attached to said plates so as to extend adjacent an opposite side of such associated airbag spring in a second plane, said airbag springs in each of said groups being positioned relative to one another so that said first and second planes associated with any one of said airbag springs extend at a right angle to said first and second planes associated with each adjacent airbag spring, and wherein a single plane contains the longitudinal axes of the airbag springs comprising a group of such airbag springs and said first and second planes associated with some of said airbag springs in such group extends parallel to the plane containing the axes of said airbag springs.

12. An active vibration isolation system for damping movement of a load comprising, in combination:
a plurality of airbag springs for supporting a load and isolating the load from vibration, said airbag springs each having a top end and a bottom end and including a flexible chamber extending between said ends, each airbag spring having a longitudinal axis extending centrally thereof;
a top plate and a bottom plate attached to the top and bottom ends respectively of each of said airbag springs, said top and bottom plates being caused to move toward and away from one another with changes in the load and the pressure of the volume of air within the chambers of said airbag springs, said top and bottom plates each extending perpendicularly to the longitudinal axis of the associated airbag;
a servo system for admitting air to and exhausting air from the chambers of said airbag springs as a function of changes in the spacing between said top and bottom plates, whereby to cause said airbag springs to expand or contract in a direction to oppose movement of said top and bottom plates toward and away from one another; and
means for damping movement of said load, including at least two pairs of shock absorbers coupled between said top and bottom plates, each shock absorber of a pair having a longitudinal axis and containing a hydraulic fluid; the axes of one of said pairs of shock absorbers lying in a first plane, and the axes of the other of said pairs lying in a second plane; said at least two pairs of shock absorbers being associated with an airbag spring in such manner that the longitudinal axis of said airbag spring lies parallel to the first and second planes; each of said shock absorbers being disposed so that its longitudinal axis extends transversely to the top and bottom plates, and further wherein one of said two pairs of shock absorbers is positioned on one side of an airbag spring and the other of said two pairs of shock absorbers is positioned on an opposite side of such airbag spring.

13. An active vibration isolation system for damping movement of a load comprising, in combination:
a plurality of airbag springs for supporting a load and isolating the load from vibration, said airbag springs each having a top and a bottom end and including a flexible chamber extending between said ends, each airbag spring having a longitudinal axis extending centrally thereof;
a top plate and a bottom plate attached to the top and bottom ends respectively of each of said airbag springs, said top and bottom plates being caused to move toward and away from one another with changes in the load and the pressure of the volume of air within the chambers of said airbag springs;
a servo system for admitting air to and exhausting air from the chambers of said airbag springs as a function of changes in the spacing between said top and bottom plates, whereby to cause said airbag springs to expand or contract in a direction to oppose movement of said top and bottom plates toward and away from one another; said servo system comprising:
a source of pressurized air;
said plurality of airbag springs being arranged in at least three groups;
at least three servo-valves, each of said valves:
being operatively associated with a corresponding respective one of said groups of airbag springs;
having an axially-movable member;
being pneumatically coupled to the chambers of the airbag springs of said one group; and
having means enabling its coupling to a source of pressurized air, said each servo-valve being so constructed as to feed pressurized air to or exhaust pressurized air from said chambers as a function of changes in position of said axially movable member;
a plurality of damping means extending between and coupled to said plates so as to dampen relative movement of said plates in parallel with the damping action of said airbag springs, each of said damping means comprising at least one pair of shock absorbers coupled between said top and bottom plates, each shock absorber of said pair having a longitudinal axis; each pair of shock absorbers being disposed next adjacent to an airbag spring; the axes of said pair of shock absorbers lying in a single common plane; said at least one pair of shock absorbers being associated with an airbag spring in such manner that the longitudinal axis of said airbag spring lies parallel to the common plane which includes the axes of the said one pair of shock absorbers; and a plurality of linkage assemblies each coupling said axially-movable member of one of said at least three servo-valves to said top and bottom plates.

14. An active vibration isolation system for damping movement of a load comprising, in combination:

at least three groups of airbag springs, each airbag spring having an axis extending centrally thereof, said three groups of airbag springs being spaced from one another in a predetermined arrangement, each group including: a plurality of airbag springs containing air under pressure, each airbag spring having a top end and a bottom end spaced apart from one another, each of said airbag springs having a flexible air chamber extending between its top and bottom ends, with a port for admitting air to and removing air from said chamber;

at least three rigid top plates, each being attached to the top ends of a group of air springs; and at least three rigid bottom plates, each being attached to the bottom ends of a group of air springs; said top and bottom plates being caused to move toward and away from one another with changes in the load and the pressure of the volume of air within the chambers of said airbag springs;

a servo system including at least three servo-valve means, each being coupled to a different group of said airbag springs for supplying pressurized air to or exhausting pressurized air from said airbag springs as a function of the spacing between said top and bottom plates so as to cause said airbag springs to expand or contract in a direction to oppose movement of said top and bottom plates toward and away from one another, whereby any temporary deviation from a predetermined spacing between said plates caused by changes in said load is eliminated; and a plurality of damping means coupled to said plates so as to dampen relative movement of said plates in parallel with said airbag springs, each of said damping means being outside of and parallel to an airbag spring for damping movement of said plates toward and/or away from one another; each of said damping means comprising at least two pairs of shock absorbers extending between and coupled to the top and bottom plates associated with such airbag spring, each shock absorber of said pair extending along a longitudinal axis and each airbag spring having a longitudinal axis extending centrally thereof, and the parallel arrangement between each airbag spring and its associated damping means being accomplished by the longitudinal axes of said pair of shock absorbers lying in a single common plane, which plane is parallel to the longitudinal axis of the airbag spring, one pair being attached to said plates so as to extend adjacent one side of said each airbag spring in a first plane and the other pair being attached to said plates so as to extend adjacent an opposite side of said each airbag spring in a second plane, said airbag springs in each of said groups being positioned relative to one another so that said first and said second planes which are associated with any one of said airbag springs extend at a right angle to said first and said second planes associated with each adjacent airbag spring, and wherein a single plane contains the longitudinal axes of the airbag springs comprising each group of such airbag springs and said first and said second planes associated with some of said airbag springs in such group extends at a right angle to the plane containing the axes of said airbag springs.

15. An active vibration isolation system for damping movement of a load comprising, in combination:

at least three groups of airbag springs, each airbag spring having an axis extending centrally thereof, said three groups of airbag springs being spaced from one another in a predetermined arrangement, each group including: a plurality of airbag springs containing air under pressure, each airbag spring having a top end and a bottom end spaced apart from one another, each of said airbag springs having a flexible air chamber extending between its top and bottom ends, with a port for admitting air to and removing air from said chamber;

at least three rigid top plates, each being attached to the top ends of a group of air springs; and at least three rigid bottom plates, each being attached to the bottom ends of a group of air springs; said top and bottom plates being caused to move toward and away from one another with changes in the load and the pressure of the volume of air within the chambers of said airbag springs;

a servo system including at least three servo-valve means, each being coupled to a different group of said airbag springs for supplying pressurized air to or exhausting pressurized air from said airbag springs as a function of the spacing between said top and bottom plates so as to cause said airbag springs to expand or contract in a direction to oppose movement of said top and bottom plates toward and away from one another, whereby any temporary deviation from a predetermined spacing between said plates caused by changes in said load is eliminated; and a plurality of damping means coupled to said plates so as to dampen relative movement of said plates in parallel with said airbag springs, each of said damping means being outside of and parallel to an airbag spring for damping movement of said plates toward and/or away from one another; each of said damping means comprising at least two pairs of shock absorbers extending between and coupled to the top and bottom plates associated with such airbag spring, each shock absorber of said pair extending along a longitudinal axis and each airbag spring having a longitudinal axis extending centrally thereof, and the parallel arrangement between each airbag spring and its associated damping means being accomplished by the longitudinal axes of said pair of shock absorbers lying in a single common plane, which plane is parallel to the longitudinal axis of the airbag spring, one pair being attached to said plates so as to extend adjacent one side of said each airbag spring in a first plane and the other pair being attached to said plates so as to extend adjacent an opposite side of said each airbag spring in a second plane, said airbag springs in each of said groups being positioned relative to one another so that said first and said second planes which are associated with any one of said airbag springs extend at a right angle to said first and said second planes associated with each adjacent airbag spring, and wherein a single plane contains the longitudinal axes of the airbag springs comprising a group of such airbag springs, and said first and second planes associated with some of said airbag springs in such group extends parallel to the plane containing the axes of said airbag springs.

* * * * *

UNITED STATES PATENT AND TRADEMARK OFFICE
CERTIFICATE OF CORRECTION

PATENT NO.  : 5199690
DATED       : April 6, 1993
INVENTOR(S) : Philip Marshall

It is certified that error appears in the above-identified patent and that said Letters Patent is hereby corrected as shown below:

Claim 14, column 13, line 49, after the word "axis" add -- and each airbag spring having a longitudinal axis --.

Signed and Sealed this

Thirtieth Day of November, 1993

Attest:

BRUCE LEHMAN

*Attesting Officer*    *Commissioner of Patents and Trademarks*